United States Patent
Wada et al.

(10) Patent No.: US 10,221,068 B2
(45) Date of Patent: Mar. 5, 2019

(54) OZONE GENERATING SYSTEM AND OPERATION METHOD THEREOF

(71) Applicant: Mitsubishi Electric Corporation, Chiyoda-ku (JP)

(72) Inventors: Noboru Wada, Chiyoda-ku (JP); Yasutaka Inanaga, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 205 days.

(21) Appl. No.: 15/308,641

(22) PCT Filed: Apr. 15, 2015

(86) PCT No.: PCT/JP2015/061533
§ 371 (c)(1),
(2) Date: Nov. 3, 2016

(87) PCT Pub. No.: WO2015/198694
PCT Pub. Date: Dec. 30, 2015

(65) Prior Publication Data
US 2017/0183229 A1    Jun. 29, 2017

(30) Foreign Application Priority Data
Jun. 27, 2014   (JP) ................. 2014-132347

(51) Int. Cl.
*C01B 13/11* (2006.01)
*B01D 53/56* (2006.01)

(52) U.S. Cl.
CPC ............ *C01B 13/115* (2013.01); *B01D 53/56* (2013.01); *C01B 13/11* (2013.01);
(Continued)

(58) Field of Classification Search
None
See application file for complete search history.

(56) References Cited

U.S. PATENT DOCUMENTS

2002/0148486 A1* 10/2002 Roche .................... B01J 19/002
                                                        134/19
2012/0156106 A1*  6/2012 Murata .................... C01B 13/11
                                                        422/186.2
(Continued)

FOREIGN PATENT DOCUMENTS

JP          55-7522 A      1/1980
JP          04-31302 A     2/1992
(Continued)

OTHER PUBLICATIONS

Combined Chinese Office Action and Search Report dated Feb. 12, 2018 in Patent Application No. 201580028021.7 (with English language translation and English translation of categories of cited documents).
(Continued)

*Primary Examiner* — Kishor Mayekar
(74) *Attorney, Agent, or Firm* — Oblon, McClelland, Maier & Neustadt, L.L.P.

(57) ABSTRACT

In an ozone generating system which performs intermittent operation, that is, an operation in an ozone generating operation period in which ozone is generated by discharging gas including oxygen at a discharge electrode part and an operation in an ozone generating operation standby period in which ozone is not generated by stopping discharge are alternately repeated, a gas circulating device which circulates gas in the ozone generating apparatus and removes at least nitric acid from the gas which is circulated is connected to the ozone generating apparatus.

9 Claims, 10 Drawing Sheets

(52) U.S. Cl.
CPC ...... *C01B 2201/10* (2013.01); *C01B 2201/22* (2013.01); *C01B 2201/64* (2013.01); *C01B 2201/76* (2013.01); *C01B 2201/90* (2013.01)

(56) References Cited

U.S. PATENT DOCUMENTS

| | | |
|---|---|---|
| 2012/0219460 A1 | 8/2012 | Okihara et al. |
| 2015/0021162 A1 | 1/2015 | Wada et al. |

FOREIGN PATENT DOCUMENTS

| | | |
|---|---|---|
| JP | 2002-265204 A | 9/2002 |
| JP | 2008-222495 A | 9/2008 |
| WO | WO 02/083552 A1 | 10/2002 |
| WO | WO 2013/150819 A1 | 10/2013 |

OTHER PUBLICATIONS

Office Action dated Nov. 8, 2017 in Canadian Patent Application No. 2,953,302.
Extended European Search Report dated Oct. 6, 2017 in European Patent Application No. 15812317.4.
International Search Report dated Jun. 2, 2015 in PCT/JP2015/061533 filed Apr. 15, 2015.

\* cited by examiner

OZONE GENERATING SYSTEM AND OPERATION METHOD THEREOF

TECHNICAL FIELD

This invention relates to an ozone generating system using an ozone generating apparatus for generating ozone by using discharge and its operation method.

BACKGROUND ART

In an ozone generating apparatus in which ozone ($O_3$) is generated using gas including oxygen as a material gas by using discharge, it is generally known such that nitrogen oxide ($NO_x$) is by-produced when ozone is generated. Further, nitrogen oxides ($NO_x$) which is by-produced is under the coexistence of ozone, most of nitrogen oxides ($NO_x$) is present as the structure of dinitrogen pentoxide ($N_2O_5$). Dinitrogen pentoxide ($N_2O_5$) is a subliming material which becomes a solid at room temperatures lower than 30 degrees, therefore dinitrogen pentoxide ($N_2O_5$) easily changes its phase between a solid and gas. However, under ordinary operation conditions, it is very probable such that dinitrogen pentoxide ($N_2O_5$) is attached to almost whole area of discharge space as a discharge product.

On the other hand, regarding general ozone generating apparatuses, a periodical check, which is performed once in three to five years, is recommended by suppliers. When a periodical check is performed, maintenance operation, in which all systems are halted, and further, ozone generating systems are opened to the atmospheric air, electrodes are taken out for cleaning, is performed. When an ozone generating apparatus to which solid $N_2O_5$ is attached is opened to the atmospheric air, it is concerned such that $N_2O_5$ reacts with moisture in the air, nitric acid ($HNO_3$) is generated so as to corrode metallic materials. Especially, when electrode parts are corroded, at the time of restarting, ozone generation efficiency is reduced, and further, in some cases, a short circuit between electrodes may be caused. Further, a dew-point of a material gas is an important control factor. Moisture which remains the inside of an ozone generating apparatus after an ozone generating apparatus is opened to the atmospheric air or moisture which is accompanied by a material gas reacts with $N_2O_5$ which is generated in an ozone generating apparatus at the time of restarting and $HNO_3$ is secondarily produced. Consequently, sufficient gas purge and lowering dew-point is necessary for an ozone generating apparatus.

A method for handling an ozone generating apparatus in which by using a water heating system so as to maintain heating an ozone generating apparatus tank, $N_2O_5$ which is attached to the inside of an ozone generating apparatus is vaporized to be removed, is disclosed (for example, refer to Patent Document 1), and it is proposed such that before an ozone generating apparatus is opened to the atmospheric air, $N_2O_5$ which is a factor for generating $HNO_3$ is removed.

Further, with respect to an ozone generating apparatus in which gas is sealed in a tank, and an operation is stopped, an ozone generating apparatus, having means for circulating dry gas in order to prevent moisture entering from outside and prevent generating $HNO_3$ in an ozone generating apparatus, is proposed (for example refer to Patent Document 2).

An ozone generating apparatus, in which in a case where an operation of an ozone generating apparatus has to be stopped without performing a proper stopping step such as emergency shut down, because an ozone generating apparatus needs to be opened to the atmospheric air immediately, in order to suppress corrosion of electrodes which is caused by $HNO_3$ which is inevitably generated, at an end of an electrode tube corresponding to the side of entrance of a material gas, a gas flow amount controlling plug is provided so as to limit an amount of $HNO_3$ which enters the inside of an electrode tube, and corrosion of electrodes which are arranged the inside of electrode tube is reduced, is proposed (for example, refer to Patent Document 3).

As above mentioned, the anxiety of corrosion of a metallic material which is caused by $HNO_3$ in an ozone generating apparatus is discussed on the assumption that an ozone generating apparatus is opened to the atmospheric air, or an ozone generating apparatus is contacted with moisture in the atmospheric air, and measures are considered. In order to suppress corrosion of a metallic material, especially corrosion of an electrode which is caused by $HNO_3$, it is important such that $N_2O_5$, which is a factor of corrosion, and moisture is not contacted with the inside of an ozone generating apparatus, in a case of a cylindrical multi-tube ozone generating apparatus, it is especially important such that $N_2O_5$ and moisture is not contacted with the inside of an electrode tube. Conventionally, accompanying of moisture is prevented by using gas having a low dew-point for an ozone generating apparatus, and after ozone is generated, before an ozone generating apparatus is opened to the atmospheric air, by adequately replacing gas in an ozone generating apparatus, remaining $NO_x$ is removed and an electrode part can be prevented from contacting with $HNO_3$.

PRIOR ART REFERENCE

Patent Document

[Patent Document 1]
Japanese Patent Application Laid-Open No. 2002-265204 (Paragraph 0025 to 0035, FIG. 1 to FIG. 3)
[Patent Document 2]
Japanese Patent Application Laid-Open No. 1992-31302 (Page 5 to 6, FIG. 2)
[Patent Document 3]
Japanese Patent Application Laid-Open No. 2008-222495 (Paragraph 0018 to 0024, FIG. 2 to FIG. 4)

DISCLOSURE OF THE INVENTION

Problems to be Solved by the Invention

Regarding ozone generating apparatuses so called a cylindrical multi-tube type, the tendency of reducing cost is high density and high integration of electrode tubes which can be mounted per one apparatus. Further, an electrode tube which is mentioned here includes a combination of a metallic ground electrode tube and a high-voltage electrode tube having a conductive layer which is provided at an inner surface of a dielectric tube which is made of glass, ceramics, etc., which are arranged concentrically and coaxially. In order to realize high density and high integration, there is the tendency such that a diameter of one electrode tube to be applied is reduced, therefore, a low-cost electrode tube which is sold on the open market can be used. On the other hand, when the diameter of an electrode tube is reduced, with respect to a high voltage electrode tube, the technology for forming a conductive layer is limited, therefore a conductive layer to be formed is made to be a thinner film, inevitably. Understandably, when a conductive layer is made to be a thinner film, in comparison with a thick film, a thin film has poor resistance to corrosion and deterioration, therefore, duration of life of an apparatus is highly influenced. Consequently, recently, it is further necessary to prevent a conductive layer contacting with $HNO_3$.

Further, recently, from the view point of saving energy, efficient operation of an ozone generating apparatus is performed, and performing an intermittent operation rather than a continuous operation increases. In an intermittent operation, after a certain fixed period of operation, a predetermined period of operation stopping is provided, and during the operation stopping period, gas flow is stopped, that is, operation is on standby. Depending on load conditions of an ozone utilizing facility, in some cases, the operation stopping period extends for several days to several weeks. However, reaction in which $HNO_3$ is generated from $N_2O_5$ and reaction of $HNO_3$ and a metal is comparatively quick reaction, and even during the short stopping period, in an ozone generating apparatus, $NO_x$ including the $N_2O_5$ and $HNO_3$ is desorbed and diffused, consequently, an electrode part is corroded and deteriorated. As a matter of course, even during the stopping period, by flowing constantly a material gas in an ozone generating apparatus, $NO_x$ and $HNO_3$ which is desorbed with the lapse of time can be removed to the outside of an ozone generating apparatus in real time. However, it is difficult for the user-side to accept the situation such that in spite of providing a stopping period for an efficient operation, in an ozone generating apparatus whose operation is on standby, gas is consumed and cost is generated.

This invention is made so as to solve the above-mentioned problems, and in an ozone generating system using an ozone generating apparatus having an operation standby state in which gas is sealed such as an intermittent operation and halt, this invention aims to prevent corrosion of electrode parts which is caused by $HNO_3$ (nitric acid) by considering recent apparatuses and an operation condition and reconsidering a cause thoroughly.

Means for Solving the Problems

An ozone generating system according to this invention comprises an ozone generating apparatus having discharge electrodes which are arranged facing each other so as to form discharge space, a gas supplying device supplying a material gas including oxygen to the ozone generating apparatus, a cooling device supplying cooling water for cooling discharge electrodes, a power supply supplying electricity to discharge electrodes for discharging and a control unit controlling a gas supplying device and a power supply, wherein the control unit controls so as to perform an intermittent operation, in which an ozone generating operation period in which ozone is generated by the ozone generating apparatus by supplying a material gas from the gas supplying device to the ozone generating apparatus and by supplying electricity from the power supply to the discharge electrodes and an ozone generating operation standby period in which supplying of gas from the gas supplying device to the ozone generating apparatus and supplying of electricity from the power supply to discharge electrodes is stopped are alternately repeated, wherein a gas circulating device for circulating gas in the ozone generating apparatus and removing at least nitric acid from the gas which is circulated is provided, and the control unit controls such that in the ozone generating operation standby period, the gas in the ozone generating apparatus is replaced by the material gas, and the pressure in the ozone generating apparatus is increased higher than the atmospheric pressure, and the gas circulating device is connected to the ozone generating apparatus.

Further, a gas exhausting device for exhausting gas in the ozone generating apparatus to the atmospheric air is provided, the control unit controls such that in the ozone generating operation standby period, the gas in the ozone generating apparatus is replaced by the material gas, after the pressure in the ozone generating apparatus is increased to be higher than the atmospheric pressure, while maintaining the pressure in the ozone generating apparatus is higher than the atmospheric pressure, via a gas exhausting device, gas in an ozone generating apparatus is leaked to the atmospheric air via the gas exhausting device.

Advantage of the Invention

According to this invention, in an ozone generating operation standby period of an intermittent operation, gas which is sealed in an ozone generating apparatus is circulated to the outside of an ozone generating apparatus, and at least $HNO_3$ is removed from gas which is circulated to the outside, therefore, in an ozone generating operation standby period, diffusion of $HNO_3$ in an ozone generating apparatus can be prevented. Further, in order to leak gas which is sealed in an ozone generating apparatus to the outside of an ozone generating apparatus, a gentle gas flow for one direction at a gas exit side is formed in an ozone generating apparatus, therefore, $NO_x$ and $HNO_3$ which is diffused in an ozone generating apparatus does not exit at a gas entrance side of an ozone generating apparatus. Consequently, with respect to a discharge electrode, corrosion caused by $HNO_3$ can be suppressed, as a result, a highly reliable ozone generating system can be obtained.

EMBODIMENTS FOR CARRYING OUT THE INVENTION

Figure 1:
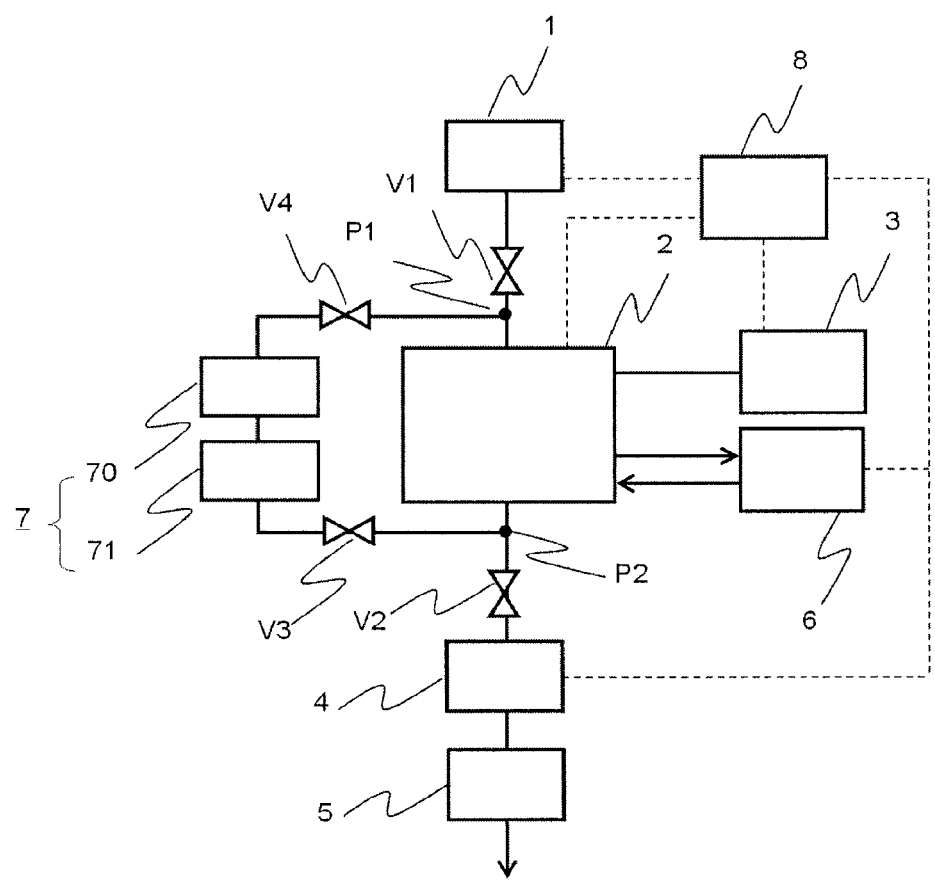
FIG. 1 is a block diagram for showing the configuration of an ozone generating system and a gas flow line according to Embodiment 1 of this invention.

First, in order to pursue a cause to generate $HNO_3$, inventors of this invention consider the following by taking an ozone generating apparatus and its operation condition in recent years into account. Some of $NO_x$ including $N_2O_5$ and $HNO_3$ which is generated in an ozone generating apparatus is absorbed by or attached to a surface of an electrode tube or an oxide film which is formed on a surface of an electrode tube. The inventors of this invention found out such that the above-mentioned can not be easily exhausted out of an ozone generating apparatus only by replacing gas in an ozone generating apparatus. According to a regular and general stopping process, adequate gas replacement (purge) is performed, for example, after the concentration of $O_3$ and $NO_x$ which is measured at a rear stage of an ozone generating apparatus reaches zero, valves of a front stage and a rear stage of an ozone generating apparatus are closed and gas flow is stopped. At that time, an ozone generating apparatus is sealed to be a pressure which is higher than the atmospheric pressure, therefore entering of moisture from the outside is prevented. Conventionally, it is considered such that at this time, accompanying of moisture to an ozone generating apparatus is prevented, the concentration of $NO_x$ in an ozone generating apparatus is small enough, therefore, generation of $HNO_3$ is suppressed.

However, after that, the inventors confirm such that due to change of ambient temperature, etc., with the lapse of time, in an ozone generating apparatus in which gas is sealed, $NO_x$ and $HNO_3$ is desorbed little by little from an inner wall surface of an apparatus or a surface of an electrode tube, and $NO_x$ and $HNO_3$ diffuse throughout the whole area of the apparatus. In a case where gas is flowed in an ozone generating apparatus, it is found out such that at a gas entrance side of an electrode tube, $O_3$, $NO_x$ and $HNO_3$, which are produced gasses, do not exist, when gas flows, the $O_3$, $NO_x$ and $HNO_3$ is exhausted to the outside of an apparatus. However, when gas is sealed in which gas flow is stopped, $NO_x$ and $HNO_3$ diffuse under the practically uniform pressure, $NO_x$ and $HNO_3$ which is desorbed exist also at a gas entrance side of an electrode tube, though in a normal operation, $NO_x$ and $HNO_3$ which is desorbed can not exist at a gas entrance side of an electrode tube.

Conventionally, regarding corrosion in an ozone generating apparatus which is caused by $NO_x$ and $HNO_3$, as above mentioned, it is discussed assuming that an ozone generating apparatus is opened to the atmospheric air. $N_2O_5$ which is generated in an ozone generating apparatus and $HNO_3$ which is generated by moisture in the atmospheric air is a subject, therefore in an ozone generating apparatus in which gas flow is stopped, generation of corrosion which is caused by $HNO_3$ is not discussed at all. Further, it is considered that usually, only by conforming to appropriate stopping procedure, a conductive layer does not contact with produced gas in an ozone generating apparatus, therefore, it is normal not to examine the corrosion of a conductive layer which is made of a thick film, and also with regard to a conductive film which is made to be thinner which is poor in resistance, the corrosion which is caused by $HNO_3$ is not examined.

Further, $HNO_3$ which is generated based on reaction with a very small amount of moisture which is contained not in the atmospheric air but in low-dew point gas is not discussed either. Further, the appropriate stopping step which is mentioned here means after ozone generation is stopped, adequate gas purge is performed and gas is sealed in an ozone generating apparatus.

As above mentioned, before an operation of the state becomes the operation standby state in which gas is sealed, increasing the temperature of an ozone generating apparatus, promoting vaporization of $N_2O_5$ which remains the inside of an ozone generating apparatus, and at the time of replacing gas, containing $N_2O_5$ and $HNO_3$ in a material gas or a purge gas from the outside and exhausting is an effective means. However, in order to heat an ozone generating apparatus in a stopping state, that is, in a state in which gas is sealed and to replace gas the inside of the apparatus, energy for heating is required, and in addition to that, it is necessary to exhaust $NO_x$ and $HNO_3$ from an ozone generating apparatus. Consequently, it is necessary to fill gas again in an ozone generating apparatus whose pressure is reduced by exhausting, therefore, increase of energy consumption and increase of cost can not be avoided. Further, in a case where dry gas is circulated in an ozone generating apparatus whose state is stopping state, gas which is accompanied by $NO_x$ and $HNO_3$ which is desorbed in an ozone generating apparatus is simply circulated in an ozone generating apparatus, therefore, the concentration of $NO_x$ and $HNO_3$ is diluted by dry gas and it appears to be decreased, however, it is rather such that diffusion of $NO_x$ and $HNO_3$ in an ozone generating apparatus is accelerated. Further, in a case where a gas flow controlling plug is provided at an open end which is a gas entrance side of an electrode tube, in a case where difference regarding pressure change between an ozone generating apparatus and an electrode tube is generated such as when an ozone generating apparatus is opened to the atmospheric air, entering of $NO_x$ and $HNO_3$ which is desorbed and diffused into the inside of an electrode tube is decreased, however, under the uniform pressure such as when an operation is standby, entering of gas into the inside of an electrode tube can not be suppressed. Further, gas which enters once is difficult to get away from the inside of an electrode tube, therefore, corrosion of an electrode can not be prevented.

Conventionally, regarding corrosion of a material which is caused by $N_2O_5$ and $HNO_3$, a case in which a material gas is air is discussed. In a case where a material gas is oxygen, as a matter of course, in comparison with a case in which a material gas is air, an amount of nitrogen component in a material gas is less, and an amount of $NO_x$ to be produced is greatly reduced. Consequently, the issue of corrosion of an electrode which is caused by $N_2O_5$ and $HNO_3$ is treated as a specific issue in a case where a material gas is air. However, $N_2O_5$ which is by-produced in an ozone generating apparatus also easily reacts with a very little amount of moisture which is accompanied by a material gas so as to produce $HNO_3$, the inventors of this invention found out such that not only in a case where a material gas is air, but also in an ozone generating operation standby period in a case where a material gas is oxygen, which is generated using PSA (Pressure Swing Adsorption) type oxygen generating device or VPSA (Vacuum Pressure Swing Adsorption) type oxygen generating device, whose purity is comparatively low (purity is 90-95%) in comparison with liquid oxygen and oxygen bombs, same phenomena as that in a case where a material gas is air occurs. In this connection, in a case where a material gas is liquid oxygen, generally, 0.1 to 1% of nitrogen with respect to an amount of flow of liquid oxygen is accompanied, and when the accompanying amount of nitrogen is the above-mentioned, in an ozone generating operation standby period, the above-mentioned problems are not frequently generated.

Based on the consideration such that $HNO_3$ which is desorbed is diffused at the time of operation standby period as above mentioned, mainly from the view of preventing diffusion, this invention is made. Hereinafter, this invention will be described by showing Embodiments.

Embodiment 1

Figures 2A, 2B:
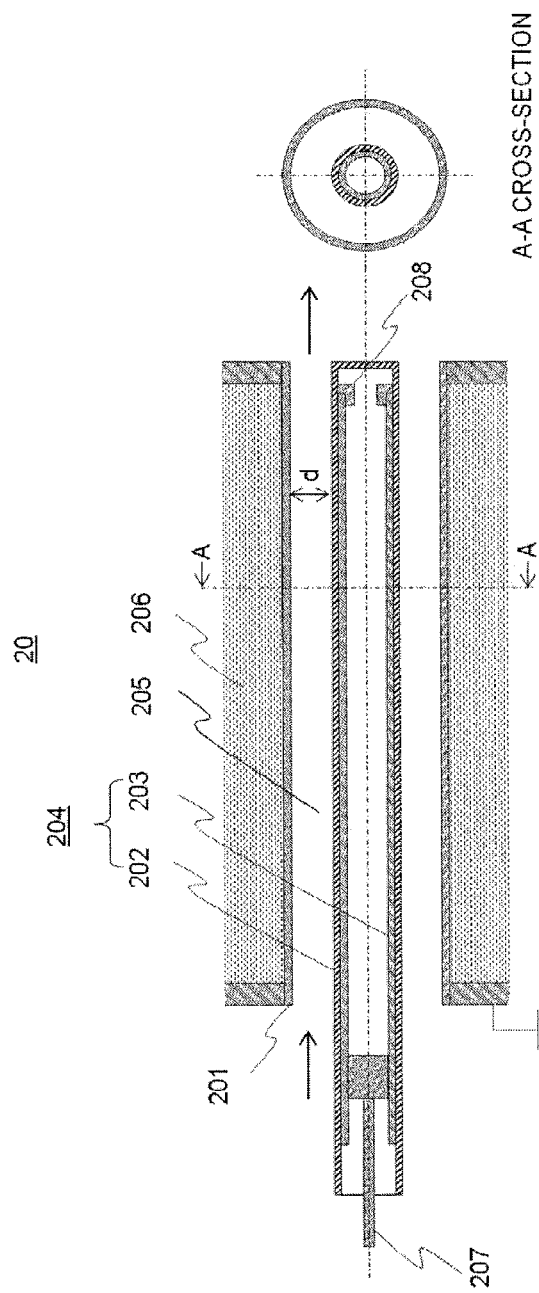
FIG. 2A and FIG. 2B are cross-sectional views showing the configuration of a discharge electrode part in an ozone generating apparatus in an ozone generating system according to Embodiment 1 of this invention.
Figure 3:
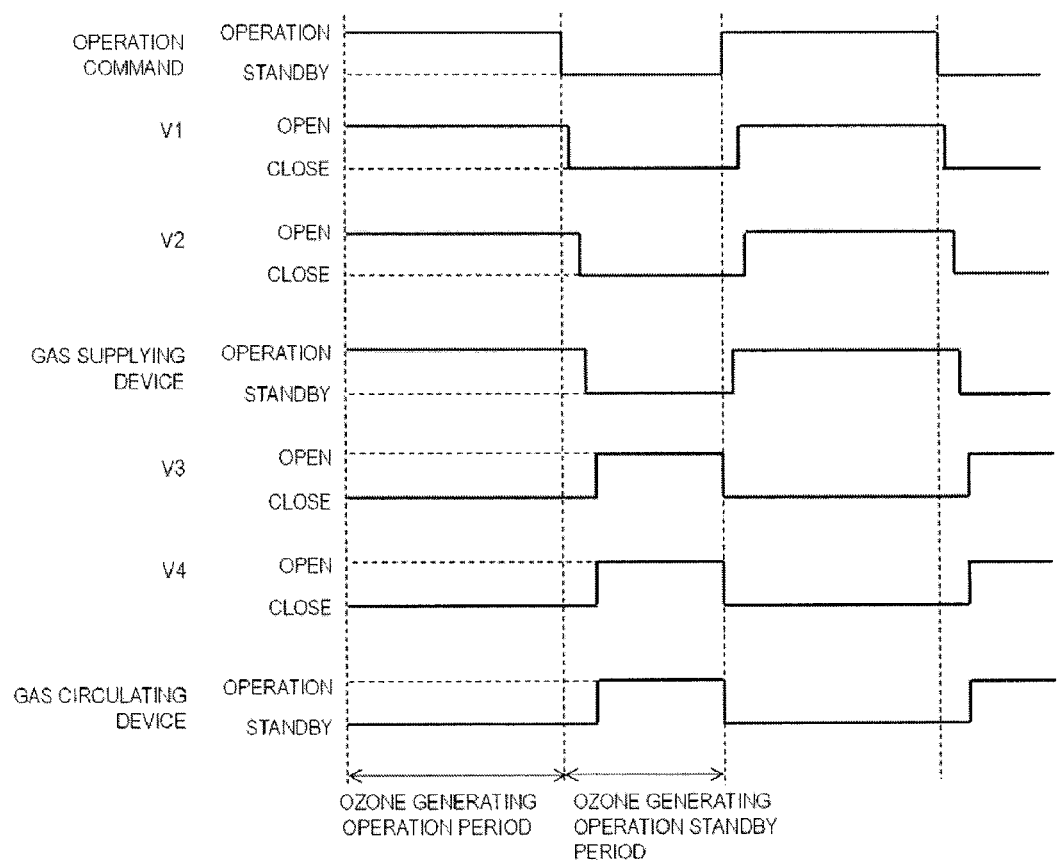
FIG. 3 is a time chart for describing an operation of an ozone generating system according to Embodiment 1 of this invention.
Figure 4:
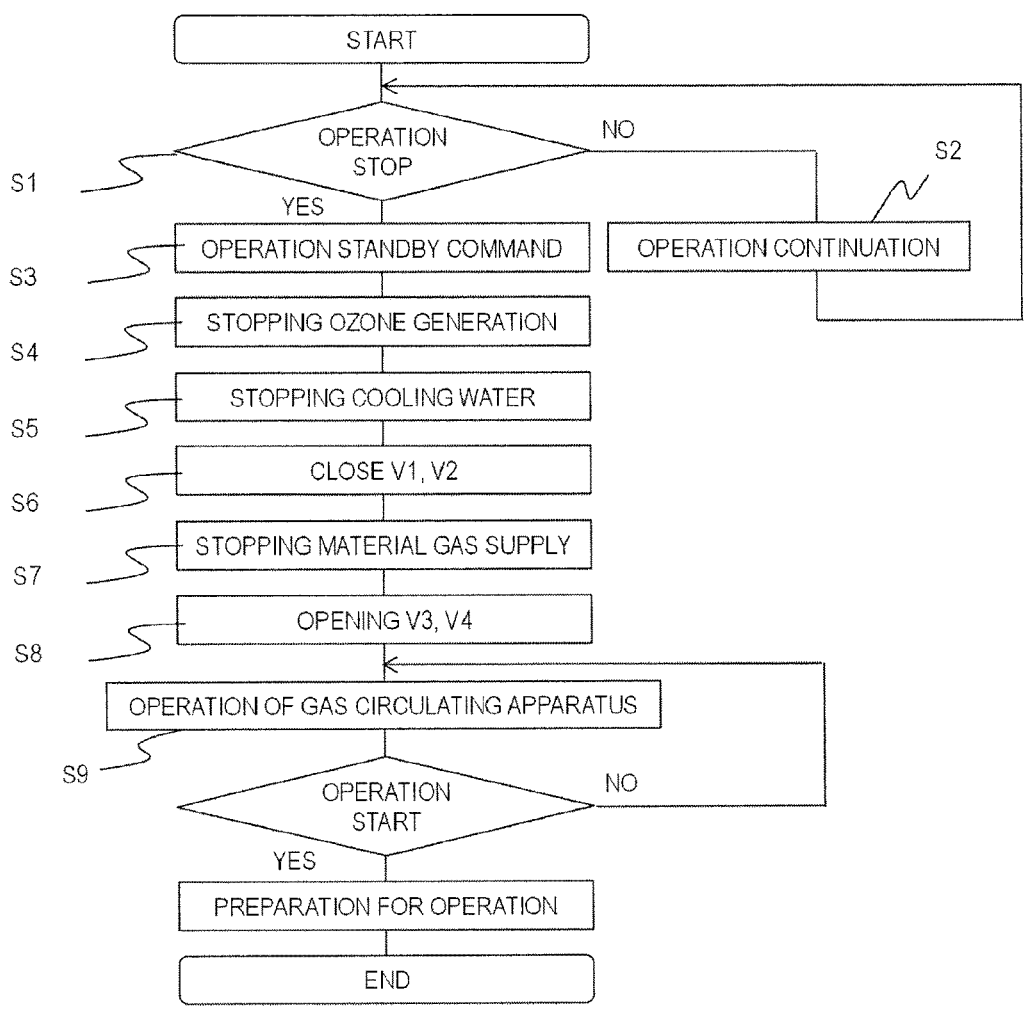
FIG. 4 is a flow chart for describing an operation of an ozone generating system according to Embodiment 1 of this invention.

FIGS. 1 to 3 are figures for describing an ozone generating system and its operation method according to Embodiment 1, FIG. 1 is a block diagram showing the configuration of an ozone generating system and its flow line, FIG. 2A and FIG. 2B are cross-sectional views showing the configuration of a discharge electrode part in an ozone generating apparatus, FIG. 2A is a cross-sectional view of a cut section of a discharge electrode part which is parallel to a direction of a gas flow, and FIG. 2B is a cross-sectional view of a discharge electrode part which is perpendicular to a direction of gas flow, taken along the line of A-A in FIG. 2A. FIG. 3 is a time chart for describing an operation of equipment when an ozone generating apparatus is intermittently operated, and FIG. 4 is a flow chart showing an operation of an ozone generating apparatus.

The configuration of an ozone generating system according to Embodiment 1 will be described. As shown in FIG. 1, an ozone generating system comprises a gas supplying device 1 for supplying a material gas, an ozone generating apparatus 2 in which ozone is generated from a material gas which is supplied from the gas supplying device 1 so as to output ozonized gas, a power supply 3 for applying an AC high voltage to the ozone generating apparatus 2, an ozone-utilizing facility 4 in which ozone treatment is performed by using ozonized gas which is outputted, a waste ozone treatment unit 5 in which ozone is removed from excess ozonized gas which is exhausted from the ozone-utilizing facility 4, a cooling device 6 for circulating cooling water for cooling the ozone generating apparatus 2, a gas circulating device 7 for circulating gas in the ozone generating apparatus 2, and a control unit 8 for controlling various kinds of valves and all of the above-mentioned so as to manage an ozone generating system. Further, a broken line in FIG. 1 shows a typical control line.

In a case where air is used as a material gas of the ozone generating apparatus 2, the gas supplying device 1 is a compressor or a blower, and in a case where oxygen is used as a material gas, the gas supplying device 1 is PSA-type or VPSA-type oxygen generating device. Further, when a compressor or a blower is used, as needed, a moisture removing unit comprising a material gas cooling/drying device is provided. Regarding the moisture removing unit, a heating regeneration type or a pressure regeneration type is used. Regarding a material gas, as gas containing oxygen, pressurized air or oxygen gas which is generated by an oxygen generating device is applied to the ozone generating apparatus 2. The ozone-utilizing facility 4 includes a water treatment facility, a waste water treatment facility, various kinds of oxidation treatment facility, and a semiconductor/liquid crystal manufacturing facility, etc.

The cooling device 6 comprises a circulating pump for circulating cooling water for cooling the ozone generating apparatus 2 and a cooling device for cooling the cooling water whose temperature is increased by absorbing heat which is generated by the ozone generating apparatus 2. As a cooling device, various kinds of heat exchange type cooling device including a liquid-liquid type and liquid-gas type or liquid-fluorocarbon refrigerant type chiller, etc. can be used. In many cases, general tap water is used as cooling water, however, in some cases, an anti-freezing fluid or a scale remover is mixed, or ion exchanged water or pure water is used.

The gas circulating device 7 comprises a gas circulating unit 70 comprising a circulating fan or a circulating pump which is sealed from outside air, etc., and the gas circulating device 7 is connected to the ozone generating apparatus 2 so as to absorb gas in the ozone generating apparatus 2 from a port P2 at a gas exit side of the ozone generating apparatus 2 and return the gas to a port P1 at a gas entrance side, and a closed system comprising the ozone generating apparatus 2 and the gas circulating device 7 is constructed. At an absorbing side of the gas circulating unit 70, a gas refining unit 71 is provided. The gas refining unit 71 removes at least $HNO_3$ (nitric acid) from gas in the ozone generating apparatus 2 which is absorbed by the gas circulating unit 70.

In the above-mentioned ozone generating system, based on a request command from the ozone-utilizing facility 4, via the control unit 8, an operation of the ozone generating apparatus 2 is controlled so as to perform an intermittent operation. When the ozone generating apparatus 2 receives an operation command, a material gas is supplied from the gas supplying device 1. When a material gas is supplied, a gas dew point in the ozone generating apparatus 2 is lower than −50 degrees, and when the pressure in the ozone generating apparatus 2 is maintained at a predetermined operation pressure, cooling water from the cooling device 6 is circulated in the ozone generating apparatus 2 so as to start generating ozone. While ozone generation is continued, an operation of the gas circulating device 7 is stopped, and gas is not circulated via the gas circulating device 7. On the other hand, when the ozone generating apparatus 2 receives a stop command, ozone generation is stopped, after gas in the ozone generating apparatus 2 is adequately replaced by using a material gas, the ozone generating apparatus 2 is sealed by gas so as to make the pressure in the ozone generating apparatus 2 to be higher than the atmospheric pressure. After that, an operation of the gas supplying device 1 and the cooling device 6 is stopped. While ozone generation is stopped and the ozone generating apparatus 2 is sealed by gas, the gas circulating device 7 is operated, gas which is sealed in the ozone generating apparatus 2 is circulated so as to maintain the gas pressure in the ozone generating apparatus 2 to be higher than the atmospheric pressure. As above mentioned, based on user's request, ozone generation, and an operation and stopping of peripheral facility is repeated, consequently, an ozone generating system can be efficiently managed.

Next, the configuration of the ozone generating apparatus 2 according to Embodiment 1 will be described. The ozone generating apparatus 2 is a silent discharge type ozone generating apparatus which comprises discharge electrodes arranged facing each other so as to form discharge space and which performs discharging via a dielectric between the discharge electrodes. Regarding an electrode shape, any shape such as a parallel plate, cylindrical tube type, etc. can be applied, however, here, as shown in FIG. 2, as a discharge electrode part 20 of the ozone generating apparatus 2, an ozone generating apparatus having a cylindrical tube type electrode will be described as an example. In the discharge electrode part 20, a high voltage electrode tube 204, comprising a high voltage electrode (conductive layer) 203 having a cylindrical shape as an electrode at a high voltage side and a dielectric 202 which is made of glass tube which is integrated with the high voltage electrode 203 so as to cover a circumferential surface of the high voltage electrode 203 and one end side, is provided. Regarding the high-voltage electrode tube 204, the one end is sealed so as for a material gas to flow only discharge space which will be described later, and not for gas to pass the inside of the high-voltage electrode tube 204. As a great amount of $O_3$ or $NO_x$ which is generated by discharge exists at downstream of gas flow direction, one end at downstream is sealed so as for the $O_3$, etc., not to enter the inside of the high voltage electrode tube 204. Further, an outer diameter of the high-voltage electrode tube 204 is 30 mm or less. The high voltage electrode 203 is a metallic thin film and is made of aluminum, chromium, titanium, nickel or an alloy containing the above-mentioned, stainless, etc. Then, as an electrode at a ground side, the ground electrode tube 201 is provided so as for an inner surface of the ground electrode tube 201 and a circumferential surface of the high voltage electrode tube 204 to face each other with a predetermined distance (=gap length, d) (which will be described later) with respect to a circumferential surface of the high voltage electrode tube 204 and is arranged so as to be coaxial with the high voltage electrode tube 204 and so as for cooling water 206 to flow in the circumference. Then, a gap between a circumferential surface of the dielectric 202 and an inner circumferential surface of the ground electrode tube 201 is discharge space 205. The discharge space 205 is gas flow passage for flowing a material gas to the direction which is indicated by an arrow in FIG, and is space for generating discharge by an AC high voltage which is applied between the ground electrode tube 201 and the high voltage electrode tube 204. Further, in the high voltage electrode tube 204, a power feed member 207 for applying a high voltage to the high voltage electrode 203 is inserted from other end side which is opened, at an end of one end side which is covered with the dielectric 202, an electric field relaxation layer 208 for suppressing surface discharge is provided. The power feed member 207 is contacted with the high voltage electrode 203 at an outer side of the ground electrode tube 201 so as for are not to being maintained when a short between electrodes is generated. Further, in a sectional view of FIG. 2B, description of the power feed member 207 is omitted.

In the ozone generating apparatus 2, many of the above-mentioned discharge electrode parts 20 are arranged in parallel corresponding to necessary amount of ozone generation so as to be stored in one tank. Then, the ozone generating apparatus 2 comprises the power supply 3 for applying an AC high voltage, by the power supply 3 which is controlled by the control unit 8, a predetermined AC voltage is applied to each of the discharge electrode part 20. In the discharge space 205 of each of the discharge electrode part 20, a material gas containing oxygen is supplied from the gas supplying device 1, an AC high voltage is applied via the power feed member 207 and ozone is generated by discharging of a material gas.

Next, the configuration and operation condition of the ozone generating apparatus 2, which is suitable for a material gas being gas containing oxygen, which is common to an ozone generating system according to Embodiment 1 and subsequent Embodiments will be described. Regarding the configuration of the discharge electrode part 20 according to each Embodiment, a gap length d of the discharge space 205 is set to be 0.1 mm or more and to be 0.6 mm or less, preferably, is set to be 0.2 mm or more and to be 0.6 mm or less. When a gap length d is set to be 0.6 mm or less, in comparison with an ozone generating apparatus whose gap length exceeds 0.6 mm, cooling efficiency of the discharge space 205 is improved, and ozone generation efficiency is increased, on the other hand, electric field intensity of the discharge space 205 is increased, consequently, a generation amount of $NO_x$ which is by-produced is increased. In a case where a material gas is air, when a gap length d is set to be less than 0.3 mm, electric field intensity of the discharge space 205 is excessively increased, a generation amount of $NO_x$ is remarkably increased, as a result, ozone generation efficiency is decreased, that is, it is not preferable. Further, in a case where a material gas is rich in oxygen, generation of higher concentration ozone is required, and in comparison with a case in which a material gas is air, a generation amount of $NO_x$ is decreased, consequently, a gap length which is shorter can be adopted. From the view point of manufacturing technology for forming a uniform gap length d, a gap length d of 0.1 mm is close to its limit, and it is preferable to set a gap length d to be 0.2 mm or more. Further, when a gap length d is set to a value which exceeds 0.6 mm, the temperature of the discharge space 205 is excessively increased, consequently, ozone generation efficiency is decreased.

Further, ozone generation efficiency is changed not only by a gap length d but also by gas pressure P in the discharge space 205. Regarding operation conditions of an ozone generating system according to each Embodiment, gas pressure P is set to be 0.2 MPaG (G: gauge pressure) or less, preferably, gas pressure P is set to be 0.05 MPaG or more and to be less than 0.2 MPaG, more preferably, gas pressure P is set to be 0.1 MPaG or more and to be less than 0.2 MPaG. Especially, in a case where a material gas is air, increase of gas pressure P suppresses the generation of $NO_x$ in the discharge space 205. Further, lower and upper limitations of gas pressure P are determined by an exhaust pressure of the gas supplying device 1, for example, in a case of a blower, maximum exhaust pressure is 0.2 MPaG or so, and also by ozonized gas pressure which is necessary for the ozone-utilizing facility 4 (in a case of water treatment device, a gas pressure P is at least 0.05 MPa or more). Further, by setting gas pressure P to be less than 0.2 MPaG, the ozone generating apparatus 2 does not fall within the class-2 pressure vessels provision, consequently, legal requirement of limitation is alleviated, therefore, handling, etc. will be easier.

That is, in each Embodiment, by setting a gap length d to be 0.1 mm or more and to be 0.6 mm or less, in a case where a material gas is air, by setting a gap length d to be 0.3 mm or more and to be 0.6 mm or less, in a case where a material gas is rich in oxygen such as a case in which using an oxygen generating apparatus is used, by setting a gap length d to be 0.1 mm or more and to be 0.3 mm or less, and further by adjusting gas pressure P, corresponding to a type of material gas and an ozone generation concentration which is required, the configuration, by which ozone generation efficiency is made to be the highest and generation amount of $NO_x$ is decreased, is adapted.

It is preferable such that input power density (input power per an electrode area) which is inputted to the ozone generating apparatus 2 is in a range of 0.05 to 0.6 $W/cm^2$, in a case where a material gas is air, input power density is 0.1 $W/cm^2$ or more and is 0.4 $W/cm^2$ or less, in a case where a material gas is rich in oxygen such as a case in which an oxygen generating device is used, input power density is 0.3 $W/cm^2$ or more and is 0.6 $W/cm^2$ or less. Input power density is an index for indicating a size of the ozone generating apparatus 2, and when input power density is larger, a size of apparatus is smaller. On the other hand, when input power density is increased, the temperature of the discharge space 205 is increased, as a result, ozone generation efficiency is deceased. From a view of generation of ozone and suppressing generation of nitric oxides, it is preferable such that the temperature of the discharge space 205 is lower, consequently, it is necessary for input power density not to be excessively increased. However, when input power density is less than 0.05 W/cm$^2$, a discharge state is dispersed, stable discharge can not be maintained, and it is not preferable.

Next, a phenomenon which occurs in the ozone generating apparatus 2 having the above-mentioned configuration under the above-mentioned operation conditions and problems which occur in conventional ozone generating systems will be described. An operation in a case where an ozone generating apparatus is intermittently operated in conventional ozone generating systems will be described. Here, a conventional ozone generating system refers to an ozone generating system having the configuration in which the gas circulating unit 70 is removed from the configuration of an ozone generating system according to Embodiment 1 shown in FIG. 1. The ozone-utilizing facility 4 transmits an operation (ozone generation) command to the ozone generating apparatus 2 together with a necessary ozone generation amount. When the ozone generating apparatus 2 receives an ozone generation command, among valves V1 and V2 which are closed, the valve V1 is opened, and a material gas is introduced from the gas supplying device 1 to the ozone generating apparatus 2. At a stage where pressure in the ozone generating apparatus 2 is increased to be a predetermined pressure which is higher than the atmospheric pressure, the valve V2 is opened. After that, cooling water having a predetermined flow rate is introduced from the cooling device 6, and when a gas dew-point in the ozone generating apparatus 2 is −50 degrees or less, ozone generation is performed for a predetermined time. The above-mentioned state refers to an ozone generating operation period. On the other hand, when the ozone generating apparatus 2 receives an operation standby (stopping of ozone generation) command from the ozone-utilizing facility 4, or receives a signal which indicates such that an operation time reaches a predetermined operation time which is determined by the control unit 8, ozone generation is stopped, after that, supplying of cooling water is stopped.

In a stopping step, in order to exhaust O$_3$ and HNO$_3$ which is produced gas from the ozone generating apparatus 2, gas in the ozone generating apparatus 2 is replaced by using a material gas for a predetermined time (depending on volume of an ozone generating apparatus and gas flow rate, in general, time of thirty minutes to one hour is necessary), or until a value which is indicated by an ozone concentration meter in the ozone generating apparatus 2 becomes zero. At the point when it is judged such that gas in the ozone generating apparatus 2 is adequately replaced, the valves V1 and V2 are closed so as to maintain the pressure in the ozone generating apparatus 2 to be higher than the atmospheric pressure, and supplying of a material gas is stopped. Here, an intermittent operation, that is, an operation is stopped and then is restarted, is the premise, consequently, regarding the gas supplying device 1 and the cooling device 6, only an operation of a pump and a compressor have to be stopped, and main power supply may be maintain power-on. The above-mentioned state refers to an ozone generating operation standby period. When a predetermined ozone generating operation standby period is passed, or when an ozone generation command from the ozone-utilizing facility 4 is received, supplying of a material gas is started, the valves V1 and V2 are opened, and again, an ozone generating operation period is repeated. By repeating the above-mentioned ozone generating operation period and ozone generating operation standby period, an intermittent operation is performed. Setting of an ozone generating operation period and an ozone generating operation standby period is made based on user's request, consequently, in some system conditions, a period of an ozone generating operation is short. There is also a case in which the valves V1 and V2 are closed without securing adequate time for exhausting produced gas from the ozone generating apparatus 2. Conversely, in some cases, a length of an ozone generating operation standby period is extremely long, that is, a length of an ozone generating operation standby period extends for several weeks. In present application, a case in which an operation of an ozone generating apparatus is stopped by periodic inspection, etc. for other than a main body of an ozone generating apparatus is included in an ozone generating operation standby period.

Conventionally, regarding an intermittent operation in an ozone generating system, before an ozone generating operation period starts, gas in an ozone generating apparatus is adequately replaced by using a material gas, therefore, it is not considered such that a produced gas including O$_3$, NO$_x$ and HNO$_3$ flows backward from a downstream side to an upstream side of an ozone generating apparatus and enters an inside of a high voltage electrode tube. It is considered such that generally, gas replacement is adequately performed, therefore, O$_3$, NO$_x$ and HNO$_3$ does not remain in an ozone generating apparatus. However, in the ozone generating apparatus 2, in an interior surface of the ground electrode tube 201, in an exterior surface of the high voltage electrode 203 and in an inner wall surface of a tank of the ozone generating apparatus 2, NO$_x$ and HNO$_3$ is absorbed, attached and remains. Especially, in an interior surface of a ground electrode tube and in an exterior surface of a high voltage electrode, an oxide, which is generated by oxidation and sputtering of a stainless steel which is a material of a ground electrode tube, is deposited, and it is found out such that NO$_x$ and HNO$_3$ which is absorbed in the above-mentioned oxide can not be easily exhausted to the outside of the ozone generating apparatus 2 even by performing gas replacement for a long time.

NO$_x$ and HNO$_3$ which is absorbed in and attached to the oxide, etc. is gradually desorbed by influence of ambient temperature, etc., therefore, even in an ozone generating operation standby period, when supplying of a material gas is continued and gas flows in the ozone generating apparatus 2, NO$_x$ and HNO$_3$ which is desorbed is exhausted to the outside of the ozone generating apparatus 2, each time. However, an ozone generating operation standby period is the state where gas is sealed, the inside of the ozone generating apparatus 2 is uniform pressure space, and gas does not flow. Consequently, inventors of this invention found out such that NO$_x$ and HNO$_3$ which is gradually desorbed is not exhausted to the outside of the ozone generating apparatus 2, in the ozone generating apparatus 2 whose pressure is uniform, concentration diffusion is generated over the whole area of the apparatus, therefore, NO$_x$ and HNO$_3$ exists also at a material gas entrance side of the ozone generating apparatus 2, though conventionally, it is not considered such that NO$_x$ and HNO$_3$ exists at a material gas entrance side of the ozone generating apparatus 2. For example, it is confirmed such that in a case of an ozone generating apparatus using air as a material gas, approximately several thousand ppm of NO$_x$ is generated together with O$_3$, most of the above-mentioned is exhausted to the outside of the ozone generating apparatus 2 by gas replacement, however, by passing several hours to several days of ozone generating operation standby period, approximately several hundreds ppm of $NO_x$ is diffused and remains over the whole area of the ozone generating apparatus 2.

Understandably, the $NO_x$ enters the inside of the high voltage electrode tube 204 whose material gas entrance side is an open end. At a position where $NO_x$ exists, at the same time, $HNO_3$, which is generated by reacting with a very small amount of moisture, exists. $NO_x$ and $HNO_3$ which enters the inside of the high voltage electrode tube 204 is trapped by the power feed member 207 which is provided in the high voltage electrode tube 204, and is concentrated on a surface of the power feed member 207. $NO_x$ and $HNO_3$ which is concentrated moves on a surface of the power feed member 207 so as to act on the high voltage electrode tube 203 on which the power feed member 207 is contacted. As a result, a part, where the power feed member 207 and the high voltage electrode tube 203 are contacted, is rapidly corroded, and is deteriorated by an oxidizing reaction. Regarding a part where the high voltage electrode tube 203 is contacted which is deteriorated by an oxidizing reaction, an electrical resistivity increases, therefore, when an ozone generating operation period starts again, that is, at an instant when electricity is supplied, the part where the high voltage electrode tube 203 is contacted disappears due to Joule heat. Due to disappearance of the high voltage electrode tube 203, supplying of electricity to the high voltage electrode tube 204 is stopped. Consequently, the high voltage electrode tube 204 does not contribute to ozone generation.

According to the above-mentioned events, in a conventional ozone generating apparatus in a case where an amount of nitrogen which is contained in a material gas is not negligible, that is, in a case where a material gas is air, or in a case where an oxygen generating device such as VPSA is used, when an ozone generating operation standby period is completed, and again, an ozone generating operation period starts, some electrode tubes do not contribute to ozone generation, and consequently, ozone generation efficiency is decreased. Then, in an ozone generating apparatus according to Embodiment 1 of this invention, based on the following configuration and operation, diffusion of $NO_x$ and $HNO_3$ in an ozone generating operation standby period is suppressed, corrosion which is caused by $NO_x$ and $HNO_3$ of the high voltage electrode 203 which is provided in an interior surface of the high voltage electrode tube 204 is prevented.

In Embodiment 1, as shown in FIG. 3 and FIG. 4, when an operation is changed from a period of an operation continuation (S1 NO, S2) to an ozone generating operation standby period (S1 YES), an operation standby command (S3) is received, ozone generation is stopped (S4), after supplying of cooling water is stopped (S5), the valves V1 and V2 are closed (S6), supplying of a material gas is stopped (S7), and the ozone generating apparatus 2 becomes gas sealed state, that is, fully sealed state. Simultaneously, a valve V3 which is connected to a port at a gas exit side P2 of the ozone generating apparatus 2 and a valve V4 which is connected to a port at a gas entrance side P1 of the ozone generating apparatus 2 are opened (S8). As a result, the gas circulating device 7 is connected to the ozone generating apparatus 2, by performing an operation (S9) of the gas circulating device 7, a closed loop of a sealed system comprising the ozone generating apparatus 2 and the gas circulating device 7 is formed. Gas which is sealed in the ozone generating apparatus 2 is circulated from the port at a gas exit side P2 to the port at a gas entrance side P1. The gas circulating device 7 is composed of the gas circulating unit 70 and the gas refining unit 71. The gas refining unit 71 is provided at an upstream side of the gas circulating unit 70, and functions as a dry type removing unit which removes at least $HNO_3$ from gas which is absorbed by the port at a gas exit side P2 and is sealed in the ozone generating apparatus 2. Undoubtedly, it is still better such that $NO_x$ and moisture is simultaneously removed.

The gas circulating unit 70 is a circulating fan or a circulating pump which is sealed from the outside air. In Embodiment 1, it is not necessary to circulate a large amount of gas, only in an ozone generating operation standby period when supplying of a material gas is stopped, without stagnating gas, by maintaining the pressure in the ozone generating apparatus 2 to be higher than the atmospheric pressure, it is only necessary to form gas flow from the port at a gas entrance side P1 to the port at a gas exit side P2. That is, it is only necessary to form gas flow whose flow rate is larger than diffusion rate of $NO_x$ and $HNO_3$, which is desorbed in the ozone generating apparatus 2, which is based on the concentration gradient from a gas exit side to a gas entrance side. Consequently, only little of gas flow in the ozone generating apparatus 2 is necessary, therefore a fan or a pump having high efficient and large capacity is not necessary. Further, the ozone concentration in gas to be circulated is extremely low, therefore, ozone resistance is not necessary for a circulating unit. As above mentioned, in an ozone generating operation standby period, gas flow is generated in the ozone generating apparatus 2, at least $HNO_3$ is removed from gas in the ozone generating apparatus 2. Gas in the ozone generating apparatus 2 is absorbed from the port at a gas exit side P2, is refined and circulated in the closed loop of the closed system, consequently, diffusion of $HNO_3$ in the ozone generating apparatus 2, especially, diffusion of $HNO_3$ to a gas entrance side can be suppressed. As a result, corrosion of high voltage electrode can be prevented.

In the gas refining unit 71, a dry type absorbing material which can absorb at least $HNO_3$, or a filter which is made of or formed of the above-mentioned is filled. As an absorbing material, zeolite, activated charcoal, alumina and alkali chemicals including calcium hydroxide and sodium hydroxide may be used. In a case where a granular material, a pellet type material or a powdery material is filled in, it is preferable such that a filter which can remove particles is provided at a downstream of the gas refining unit 71 so as to suppress accompanying of particles to the ozone generating apparatus 2. In an appropriate operation condition, ozone is not accompanied in the gas refining unit 71, however, in a case where an activated charcoal is used in order to respond to a nonstationary state in which ozone is unexpectedly mixed, from the view point of avoiding rapid temperature rising or explosion associated with decomposing of ozone, it is preferable to use a specified activated charcoal which is treated with an alumina, etc.

On the other hand, for removing $HNO_3$, generally, efficiency is higher when a wet type removing method in which water or drug solution, etc. is used is adopted. However, gas which passes through the gas refining unit 71 is circulated to the ozone generating apparatus 2 again, therefore, it is necessary to control its dew-point to be lower than −50 degrees. In a case where gas is treated according to a wet type removing method, excess energy and cost is required for recovering its dew-point, therefore, it is not preferable. Further, by utilizing cooling water for circulating in the ozone generating apparatus 2 or a warming facility which is provided in the ozone generating apparatus 2 so as to control a temperature of the ozone generating apparatus 2, promoting absorption of $NO_x$ and $HNO_3$ in an oxide film for improving the gas refining efficiency in the gas refining unit 71 is effective means. However, the above-mentioned is not preferable because, attached facilities for controlling temperature, energy and cost is added.

An intermittent operation of the ozone generating apparatus 2 is an efficient operation condition which aims to realize saving energy and low cost. As above mentioned, to the ozone generating apparatus 2 in an ozone generating operation standby period for suppressing energy consumption, inputting energy and cost for other than ozone generation goes against the idea of employing an intermittent operation. In Embodiment 1, only some energy and initial cost which is required by the gas circulating unit 70, and initial cost such as an absorbent in the gas refining unit 71 is added, consequently, saving energy which is realized by an intermittent operation is not impeded.

Further, desorption and diffusion of $NO_x$ and $HNO_3$ in an ozone generating operation standby period is advanced at a moderate speed, therefore, it is not necessary to operate the gas circulating device 7 for entire length of an ozone generating operation standby period. It is only necessary to operate the gas circulating device 7, for example, once in several hours, or once in a day. In the above-mentioned case, the valves V3 and V4 which are operated in conjunction when an operation is changed to an ozone generating operation standby period, the valves V3 and V4 may perform a switching operation in conjunction with an operation of the gas circulating device 7.

Regarding diffusion of $HNO_3$ in an ozone generating operation standby period shown in this Embodiment, when a gap length is 0.6 mm or less, diffusion of $HNO_3$ is remarkably generated. In the ozone generating apparatus 2 in this Embodiment, in comparison with an ozone generating apparatus whose gap length exceeds 0.6 mm, electric field intensity of the discharge space 205 is increased, and therefore, a generation amount of $NO_x$ itself is increased. Consequently, $NO_x$ which is accumulated on a surface of an electrode tube is also increased. That is, removing of $HNO_3$ using the gas circulating device 7 is extremely effective in an ozone generating apparatus whose gap length is set to be short as in that of this Embodiment. Further, when the diameter of an electrode tube is reduced in order to realize the miniaturization of the ozone generating apparatus 2, it is inevitably such that the high voltage electrode 203 inside the ozone generating apparatus 2 is a thin film, therefore, the miniaturization is a factor for the high voltage electrode 203 to be susceptible to $HNO_3$. Conventionally, an electrode tube having a large diameter such as about 100 mm is used, the high voltage electrode 203 is formed by thermal spraying, etc., therefore its adhesion is extremely high, and a thickness of a film is 100 μm or more. However, in a case in which an electrode tube whose diameter is 30 mm or less is used, the construction technique such as flame spray can not be adopted. Regarding an electrode tube whose diameter is 30 mm or less, a wet type coating, metal plating, vacuum deposition, etc. is adopted as the construction technique, and the high voltage electrode 203 having a fill thickness which is several tens μm or less can be realized. On the other hand, corrosion resistance against $HNO_3$ is reduced. Consequently, removing of $HNO_3$ by using the gas circulating device 7 in this Embodiment is extremely effective from the view point of reducing a diameter of an electrode tube.

As above mentioned, according to an ozone generating system in Embodiment 1, in an ozone generating operation standby period of an intermittent operation, by using the gas circulating device 7 which is provided so as to form a closed loop with the ozone generating apparatus 2, at least $HNO_3$ is removed from gas in the ozone generating apparatus 2, therefore, diffusion of $HNO_3$ in the ozone generating apparatus 2 can be suppressed. Consequently, $HNO_3$ does not enter the inside of the high voltage electrode tube 204 whose one end is an open end, therefore, corrosion of the high voltage electrode 203 can be prevented.

Embodiment 2

Figure 5:
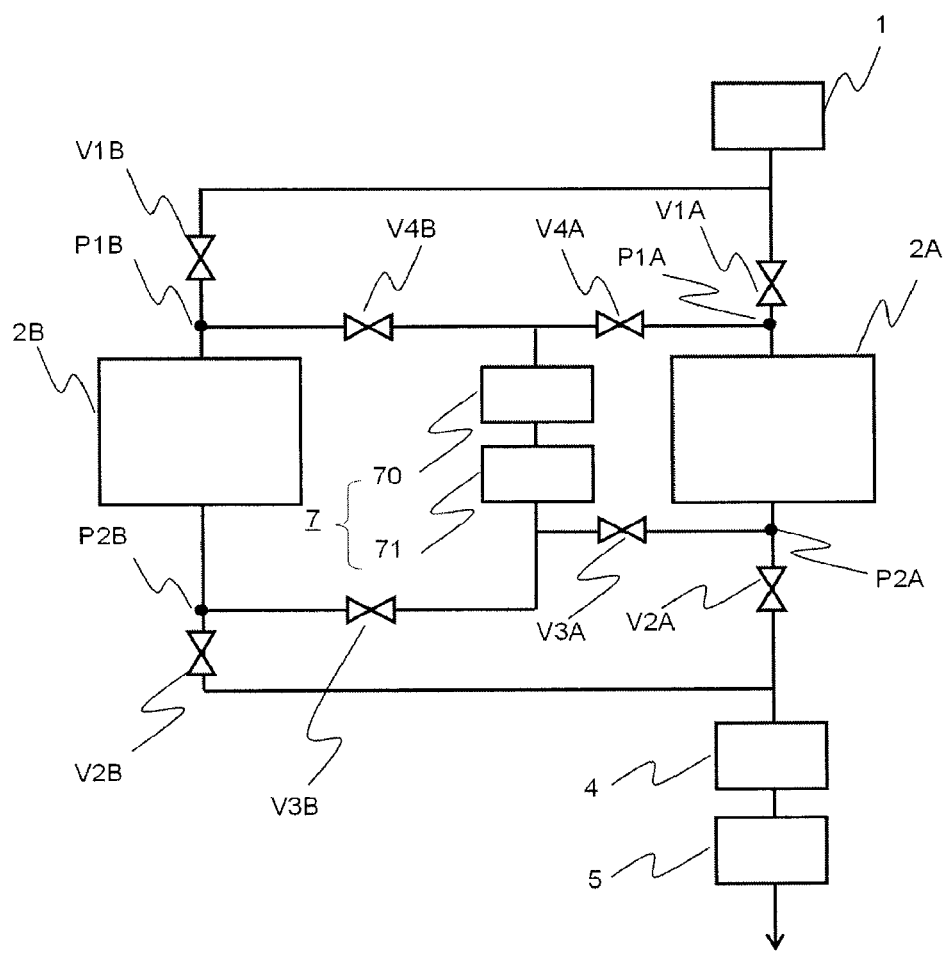
FIG. 5 is a block diagram for showing the configuration of an ozone generating system and a gas flow line according to Embodiment 2 of this invention.

An ozone generating system according to Embodiment 2 of this invention will be described. A basic configuration and operation of an ozone generating system according to Embodiment 2 is same as that of an ozone generating system according to Embodiment 1, however, there is a different point such that an intermittent operation is performed by operation control of a plurality of ozone generating apparatuses. FIG. 5 is a block diagram for describing an ozone generating system and its operation method according to Embodiment 2, and showing the configuration of an ozone generating system and a gas flow line. Here, a case in which two ozone generating apparatuses are used will be described as an example. In FIGs, a part which is same as or corresponding to the configuration of an ozone generating system according to Embodiment 1 will be given same reference character, and description will be omitted unless it is particularly required. Further, in FIG., a cooing device, a power supply, a control unit, and a control line are omitted.

Regarding an ozone generating system based on a plurality of ozone generating apparatuses, there are various kinds of operation methods. For example, there is a case such that normally, one ozone generating apparatus, that is, an ozone generating apparatus 2A is continuously operated, and the other ozone generating apparatus, that is, an ozone generating apparatus 2B is used as backup. Based on a command for increasing requirement of ozone from an ozone-utilizing facility 4, when capacity shortage of the ozone generating apparatus 2A is supplemented, the other ozone generating apparatus 2B is operated at the same time. In this case, the latter ozone generating apparatus is intermittently operated. Further, there is a case such that two ozone generating apparatuses 2A and 2B are alternately operated for a predetermined period so as to reduce operation load per one apparatus, and aims to extend life span of an apparatus, or to reduce maintenance cost. In this case, both of ozone generating apparatuses are intermittently operated.

In an ozone generating system according to Embodiment 2 shown in FIG. 5, regarding the ozone generating apparatuses 2A and 2B, a common gas circulating device 7 is provided, and a port at a gas entrance side P1A and P1B, a port at a gas exit side P2A and P2B are connected to the gas circulating device 7. Undoubtedly, a separate gas circulating device may be provided for each ozone generating apparatus, however, it is preferable to provide a common gas circulating device from the view point of cost and installation area. Here, an example showing an operation in a case in which two ozone generating apparatuses 2A and 2B are alternatively operated will be described.

When the ozone generating apparatus 2A is in an ozone generating operation period, another ozone generating apparatus 2B is in an ozone generating operation standby period. When the ozone generating apparatus 2A is in an ozone generating operation standby period, at the same time, the ozone generating apparatus 2B is an ozone generating operation period. In a case where the ozone generating apparatus 2A is in an ozone generating operation period, a valve V1A and a valve V2A are opened, a valve V1B and a valve V2B are closed, and a valve V3A and a valve V4A are closed, and a valve V3B and a valve V4B are opened. In the ozone generating apparatus 2B, gas is sealed, and in a case after ozone is generated, the gas circulating device 7 is also operated. When an ozone generating operation period of the ozone generating apparatus 2A is completed, and an operation is changed to an ozone generating operation standby period, the valve V1A and the valve V2A are closed, the valve V1B and the valve V2B are opened, the valve V3A and the valve V4A are opened, and the valve V3B and the valve V4B are closed. An operation of the ozone generating apparatus 2B is changed to an ozone generating operation period, in the ozone generating apparatus 2A, gas is sealed, and the gas circulating device 7 is also operated.

Here, an example in which in an ozone generating operation standby period, the gas circulating device 7 is continuously operated is described, however, as described in Embodiment 1, in an ozone generating operation standby period, desorption and diffusion of $NO_x$ and $HNO_3$ is gradually advanced, consequently, the continuous operation of the gas circulating device 7 is not required. Corresponding to a length of an ozone generating operation standby period, the gas circulating device 7 may be operated at regular time intervals, for example, once in several hours or once in several days. In this case, an operation of opening/closing the valve 3A, the valve 4A, the valve 3B and the valve 4B may be performed in conjunction with the operation of the gas circulating device 7.

As above mentioned, in a case where a plurality of ozone generating apparatuses are alternatively operated, there is a problem such that in a conventional ozone generating system, $NO_x$ and $HNO_3$ which is desorbed and diffused in the ozone generating apparatus 2 in an ozone generating operation standby period may affect corrosion of the high voltage electrode 203 in the high voltage electrode tube 204. However, in Embodiment 2, gas flow is generated in the ozone generating apparatus 2 which is in an operation standby, in the gas circulating device 7 which is provided outside, at least $HNO_3$ is removed from gas in the ozone generating apparatus 2, therefore diffusion of $HNO_3$ to the inside of the ozone generating apparatus 2 can be suppressed, and corrosion of the high voltage electrode 203 which is provided in the high voltage electrode tube 204 can be prevented.

Embodiment 3

Figure 6:
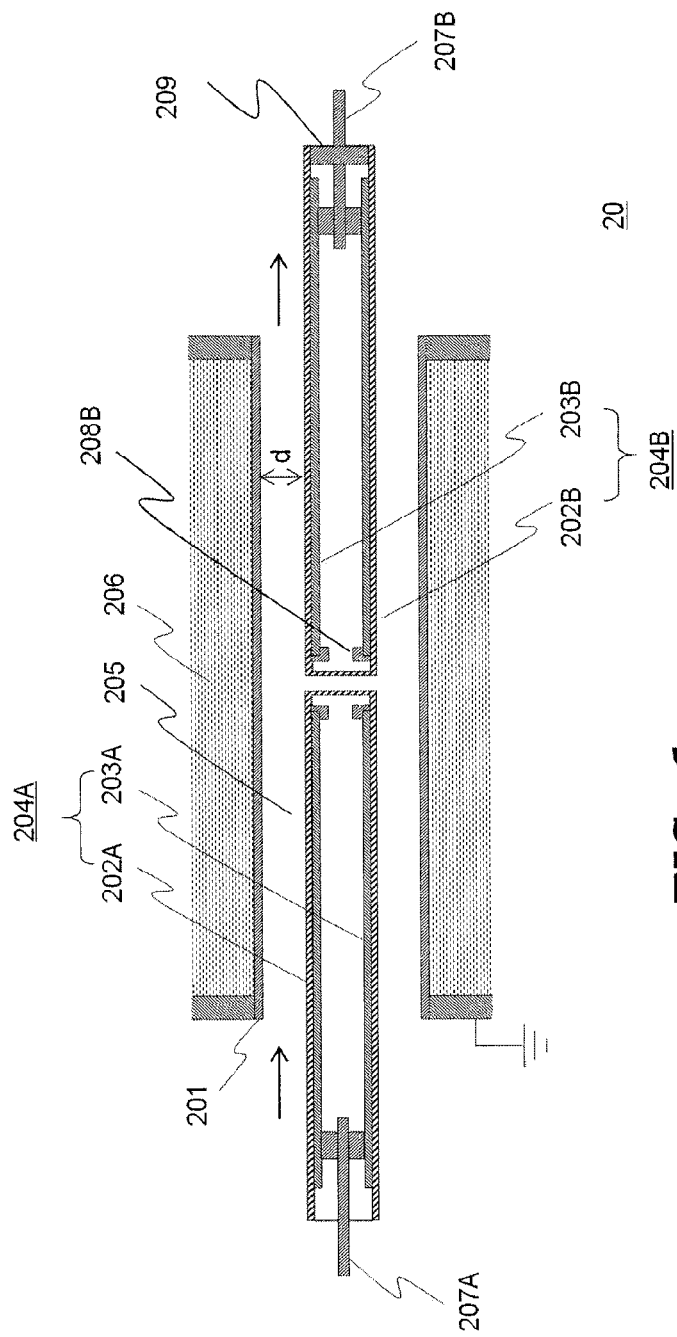
FIG. 6 is a cross-sectional view showing the configuration of a discharge electrode part in an ozone generating apparatus in an ozone generating system according to Embodiment 3 of this invention.

An ozone generating system according to Embodiment 3 of this invention will be described. A basic configuration and operation of an ozone generating system according to Embodiment 3 is same as that of an ozone generating system according to Embodiment 1 and Embodiment 2, however, there is a different point such that in an ozone generating apparatus according to Embodiment 1 and Embodiment 2, a high voltage electrode tube of the ozone generating apparatus 2 is one ground electrode tube, on the other hand, in Embodiment 3, two high voltage electrode tubes are provided in serial so as for closed end parts of the high voltage electrode tubes to face each other. FIG. 6 is a cross-sectional view showing the configuration of a discharge electrode part in the ozone generating apparatus 2 according to Embodiment 3 of this invention, and is a section view in a cut section which is parallel to gas flow direction in a discharge electrode part. In FIG., a part which is same as or corresponding to the configuration of an ozone generating system according to Embodiments 1 to 2 will be given same reference character, and description will be omitted unless it is particularly required.

By comparing to a case in Embodiment 1 and Embodiment 2, only different points will be described below. An ozone generating apparatus having a discharge electrode part shown in FIG. 6 is a tandem type ozone generating apparatus. Basic configuration is same as that of an ozone generating apparatus which is described in Embodiment 1. A tandem type ozone generating apparatus is mainly applied to an ozone generating apparatus having large volume, and in comparison with a case in which one high voltage electrode tube is provided in one ground electrode tube 202, manufacturing cost of a high voltage tank and ground electrode tube, etc. per unit ozone generation amount is reduced. Consequently, there is merit such that an ozone generating apparatus can be produced at a lower price.

In FIG. 6, a high voltage electrode tube 204A at a side of gas entrance and a high voltage electrode tube 204B at a side of exit are provided in one ground electrode tube 201, and the high voltage electrode tube 204A and the high voltage electrode tube 204B are arranged so as to face their closed ends each other. Consequently, an AC high voltage which is necessary for ozone generation is applied from two power feed members 207A and 207B which are provided at each of the high voltage electrode tubes. In the above-mentioned configuration, regarding the high voltage electrode tube 204B, an open end exists at a side of output gas which is generated in the ozone generating apparatus 2. Therefore, $O_3$ or $NO_x$ enters the high voltage electrode tube 204B. Consequently, at an open end of the high voltage electrode tube 204B, a gas sealing plug 209 for suppressing enter of $O_3$, $NO_x$, and $HNO_3$ into the inside of the high voltage electrode tube 204B is provided. Further, a high voltage electrode 203B in the high voltage electrode tube 204B may be formed of metal whose corrosion resistance is higher than that of the high voltage electrode 203A or metal which is easily passivated, and in this case, due to the resistance of metal itself, corrosion based on $O_3$, $NO_x$ or $HNO_3$ can be prevented, therefore, the gas sealing plug 209 is not absolutely necessary. Further, a surface of the high voltage electrode 203B may be coated with an inorganic insulating material including glass, ceramics, etc. so as to cover its surface, and is used as a protective coating. In a case where a protective coating is used, a function for suppressing surface discharge which is generated at an end part of the high voltage electrode tube 203B is also given, therefore, an electric field relaxation layer 208 is not necessary, and consequently, the above-mentioned is effective.

As above mentioned, according to an ozone generating system in Embodiment 3, in an ozone generating operation standby period of an intermittent operation, by using a gas circulating device 7 which is provided so as to form a closed loop with the ozone generating apparatus 2 having the tandem type configuration, at least $HNO_3$ is removed from gas in the ozone generating apparatus 2, consequently, diffusion of $HNO_3$ in the ozone generating apparatus 2 can be suppressed. As a result, $HNO_3$ does not enter the inside of the high voltage electrode tube 204, and corrosion of the high voltage electrode 203 can be prevented.

Embodiment 4

Figure 7:
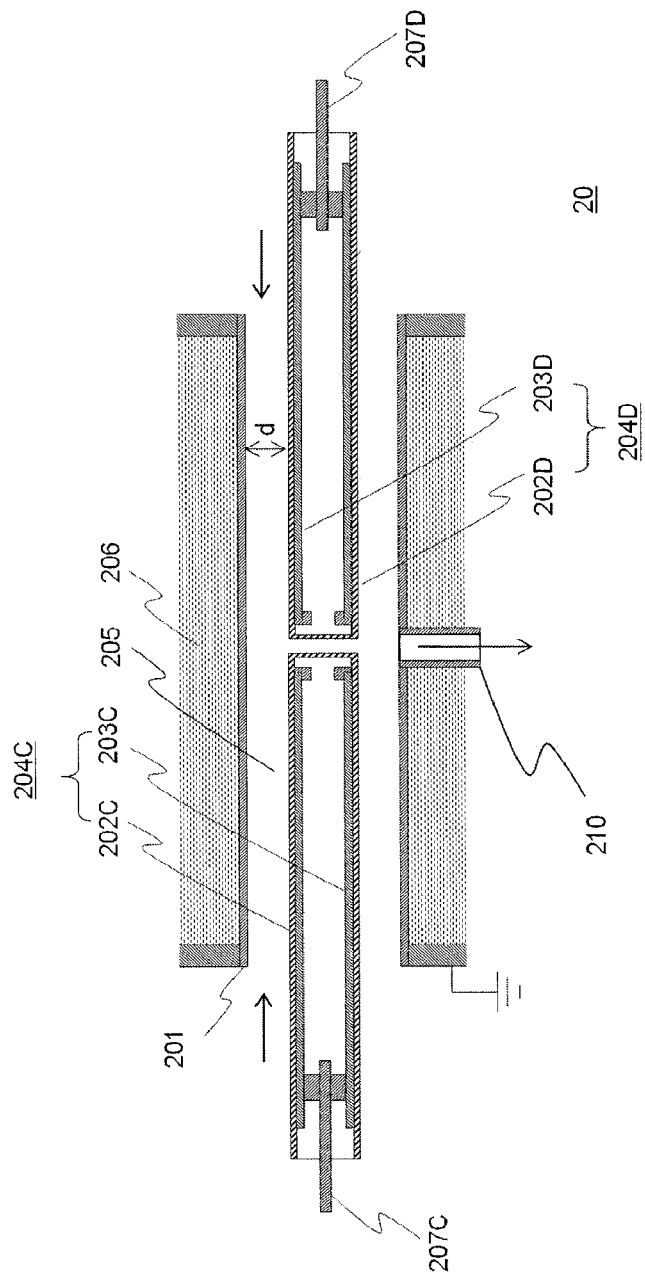
FIG. 7 is a cross-sectional view showing the configuration of a discharge electrode part in an ozone generating apparatus in an ozone generating system according to Embodiment 4 of this invention.
Figure 8:
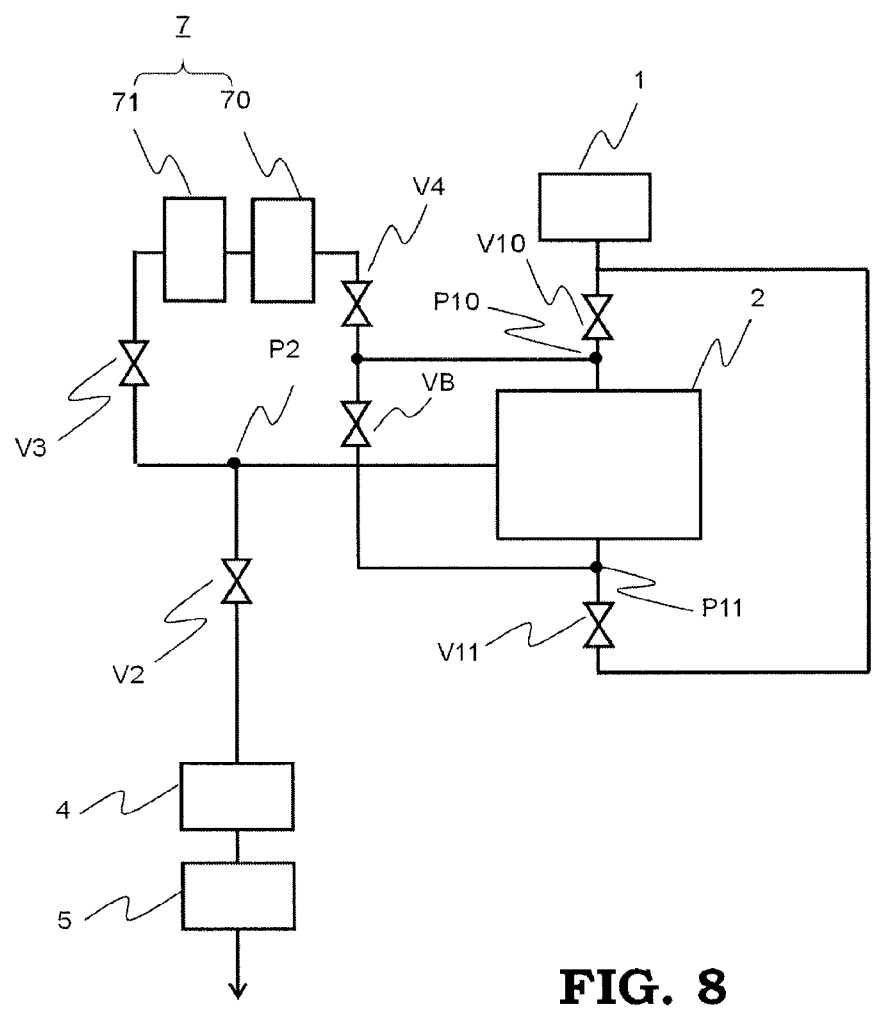
FIG. 8 is a block diagram for showing the configuration of an ozone generating system and a gas flow line according to Embodiment 4 of this invention.

An ozone generating system according to Embodiment 4 of this invention will be described. A basic configuration and operation of an ozone generating system according to Embodiment 4 is same as that of an ozone generating system according to Embodiments 1 to 3. The configuration of an ozone generating apparatus 2 is almost same as that of Embodiment 3, however, a gas entrance and a gas exit in the ozone generating apparatus 2 are different. FIG. 7 is a cross-sectional view showing the configuration of a discharge electrode part in an ozone generating apparatus in an ozone generating system according to Embodiment 4, and is a section view in a cut section which is parallel to gas flow direction in a discharge electrode part. FIG. 8 is a block diagram for describing an ozone generating system and its operation system according to Embodiment 4 and showing the configuration of an ozone generating system and a gas flow line. In FIG., a part which is same as or corresponding to the configuration of an ozone generating system according to Embodiments 1 to 3 will be given same reference character, and description will be omitted unless it is particularly required. Further, in FIG., a cooling device, a power supply, a control unit, and a control line are omitted.

In FIG. 7, from both sides, that is, from left side and right side, a material gas is supplied. A high voltage electrode tube 204C at left side of FIG. 7, which is composed of a dielectric 202C in whose inner surface, a high voltage electrode 203C is formed and a high voltage electrode tube 204D at right side of FIG. 7, which is composed of a dielectric 202D in whose inner surface, a high voltage electrode 203D is formed are provided in one ground electrode tube 201, and the high voltage electrode tubes are arranged so as to face their closed end parts each other. Consequently, an AC high voltage which is necessary for ozone generation is applied from two power feed members 207C and 207D which are provided at each of the high voltage electrode tubes. Further, a gas exit 210 is provided at a center part of the ozone generating apparatus 2, that is, a part where closed end parts of two high voltage electrode tubes 204C and 204D are facing each other.

In the above mentioned configuration, a gas circulating device 7 is connected to the ozone generating apparatus 2 via a port at a gas exit side P2, two ports at a gas entrance side P10 and P11 which are provided in the ozone generating apparatus 2. The gas exit 210 in FIG. 7 is connected to the port at a gas exit side P2 in FIG. 8. Unlike in Embodiments 1 to 3, in Embodiment 4, a bypass valve VB, which is provided at piping which bypasses valves V10 and V11 which are opened or closed at the same time and two gas entrance parts, is provided. In an ozone generating operation period, the valves V10, V11 and V2 are opened, and the valves V3, V4 and VB are closed. In an ozone generating operation standby period, both of the valves V10 and V11 are closed, further, the valve V2 is also closed, the valves V3, V4 and VB are opened, and the gas circulating device 7 is operated.

As above mentioned, according to an ozone generating system in Embodiment 4, in an ozone generating operation standby period of an intermittent operation, by using the gas circulating device 7 which is provided so as to form a closed loop with the ozone generating apparatus 2 having a tandem type configuration, at least $HNO_3$ is removed from gas in the ozone generating apparatus 2, consequently, diffusion of $HNO_3$ in the ozone generating apparatus 2 can be suppressed. As a result, $HNO_3$ does not enter the inside of the high voltage electrode tube 204, and corrosion of the high voltage electrode 203 can be prevented.

Embodiment 5

Figure 9:
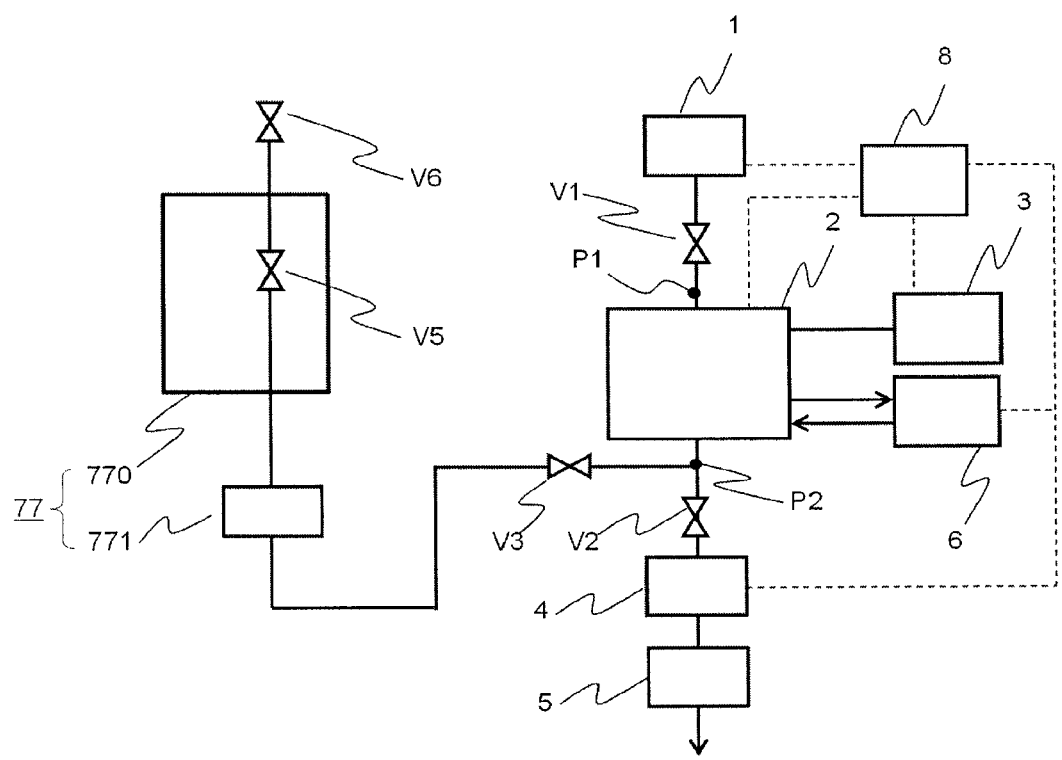
FIG. 9 is a block diagram for showing the configuration of an ozone generating system and a gas flow line according to Embodiment 5 of this invention.

An ozone generating system according to Embodiment 5 of this invention will be described. Unlike in an ozone generating system according to Embodiments 1 to 4, in an ozone generating system according to Embodiment 5, gas is not circulated in an ozone generating operation standby period, and gas which is refined is exhausted to the atmospheric air. FIG. 9 is a block diagram for describing an ozone generating system and its operation system according to Embodiment 5 and showing the configuration of an ozone generating system and a gas flow line. In FIG., a part which is same as or corresponding to the configuration of an ozone generating system according to Embodiment 1 will be given same reference character, and description will be omitted unless it is particularly required.

In FIG. 9, a gas exhausting device 77 is composed of a gas exhausting unit 770 and a gas refining unit 771, and the gas exhausting unit 770 is composed of a valve V5 which can control minute gas flow amount and a valve V6 which releases gas into the atmospheric air. In Embodiment 5, gas is not circulated, therefore, a valve V4 shown in FIG. 1, etc. is not necessary.

In Embodiment 5, in an ozone generating operation period, valves V1 and V2 are opened, and a valve V3, the valves V5 and V6 are closed. When an operation is changed from an ozone generating operation period to an ozone generating operation standby period, ozone generation is stopped, gas in the ozone generating apparatus 2 is purged, after that, the valves V1 and V2 are closed. When supplying of a material gas to the ozone generating apparatus 2 is stopped and gas in the ozone generating apparatus 2 is sealed, at the same time, the valve V3 which is connected to a port at a gas exit side P2 of the ozone generating apparatus 2 is opened, and the gas exhausting device 77 is operated. At that time, the valve V5 of the gas exhausting unit 770 is opened at an arbitrary opening degree angle, and the valve V6 is closed. As a result, the gas exhausting device 77 is connected to the ozone generating apparatus 2, gas which is sealed in the ozone generating apparatus 2 flows from the port at a gas exit side P2 to the gas exhausting device 77. The gas refining unit 771 is provided at upstream of the gas exhausting unit 770 and is a dry type removing unit which removes at least $HNO_3$ from gas which is sealed in the ozone generating apparatus 2. As a matter of course, it is more preferable such that $NO_x$ and moisture can be removed at the same time. Further, in Embodiment 5, an amount of gas which flows in the gas exhausting device 77 is extremely minute, therefore, as piping of system including the gas exhausting device 77 which is connected to a port at a gas entrance side P1 and the port at a gas exit side P2, it is preferable to use piping having smaller diameter than that of piping which is connected to the ozone generating apparatus 2 and a gas supplying device 1 or an ozone-utilizing facility 4, etc.

The valve V5 which constitutes the gas exhausting unit 770 is a valve for leaking gas which is sealed in the ozone generating apparatus 2 via the port at a gas exit side P2 and the gas refining unit 771 to the atmospheric air at an extremely minute flow rate. When the above-mentioned minute flow rate is larger than the diffusion flow rate of $NO_x$ and $HNO_3$ which is generated in an ozone generating operation standby period shown in Embodiments 1 to 4, the above mentioned minute flow rate is acceptable, and in an ozone generating operation standby period, that is, supplying of a material gas and ozone generation is stopped and in the ozone generating apparatus 2 in which gas is sealed, in a direction from the port at a gas entrance side P1 to the port at a gas exit side P2, a weak gas flow is formed. In the ozone generating apparatus 2 in an ozone generating operation standby period, a moderate flow of gas, that is, gas which is sealed is moved in one direction from the port at a gas entrance side P1 to the port at a gas exit side P2, is formed, consequently, in an ozone generating operation standby period, NO$_x$ and HNO$_3$ which is diffused in the ozone generating apparatus 2 does not exist at a side of the port at a gas entrance side P1. In Embodiment 5, the valve V5 is for leaking gas which is sealed in the ozone generating apparatus 2 while maintaining the pressure inside of the ozone generating apparatus 2 to be higher than the atmospheric pressure via the gas exhausting unit 770 at an extremely moderate rate. Consequently, it is necessary to set the control flow rate of the valve V5 by sufficiently considering the diffusion flow rate of NO$_x$ and HNO$_3$ and a length of an ozone generating operation standby period, and it is necessary to pay attention not for the pressure in the ozone generating apparatus 2 to decrease to the atmospheric pressure in an ozone generating operation standby period. That is, it is preferable such that the control flow rate is set to be larger than the diffusion flow rate of NO$_x$ and HNO$_3$ in the ozone generating apparatus 2, however, it is preferable to set the flow rate to be as less as possible.

Further, as the valve V5, a valve which can moderately leak gas which is sealed in the ozone generating apparatus 2 is acceptable, and any of a slow leak valve, a slow vent valve, a pinch valve, a relief valve, a purge valve, and a needle valve, which are on sale, is acceptable. Further, under the environment in which HNO$_3$ can be exhausted to the atmospheric air, the gas refining unit 771 is not necessarily required. Regarding the gas exhausting device 77, as long as the gas exhausting device 77 has the configuration such that while the pressure of gas in the ozone generating apparatus is maintained to be higher than the atmospheric pressure and gas in the ozone generating apparatus is leaked to the atmospheric air, for example, the gas exhausting device 77 may be only composed of the valve V5.

Figure 10:
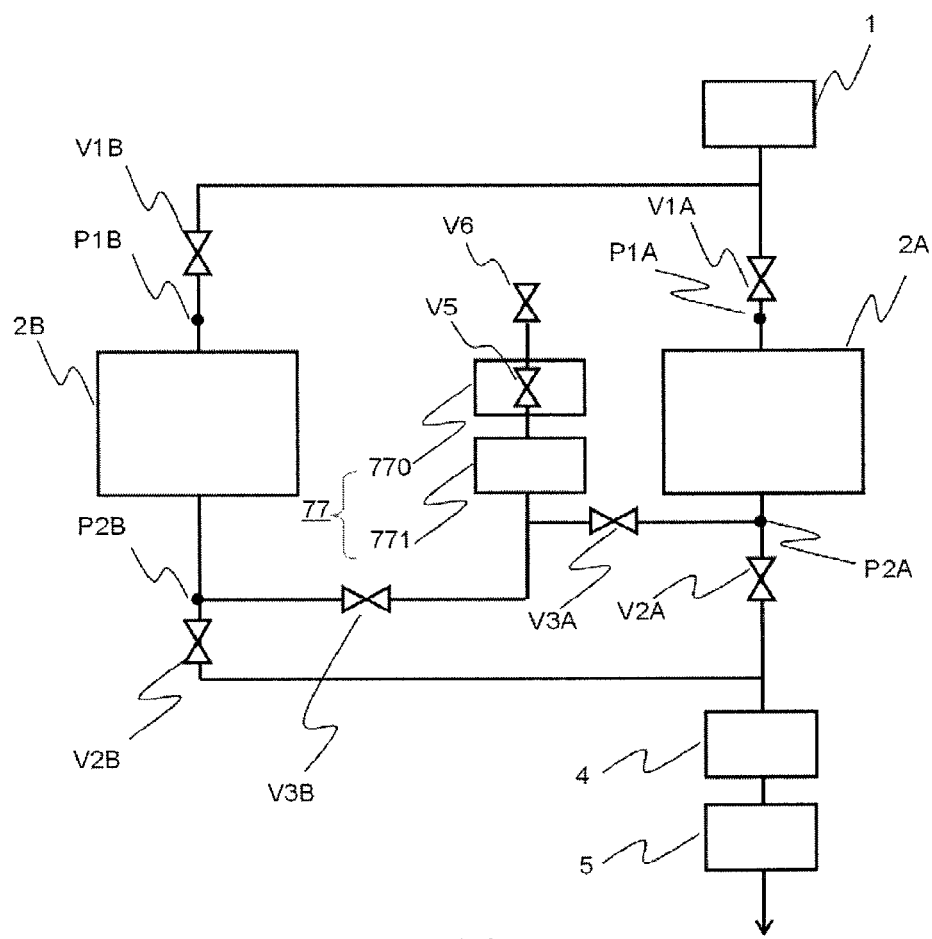
FIG. 10 is a block diagram for showing another configuration of an ozone generating system and a gas flow line according to Embodiment 5 of this invention.

FIG. 10 is a block diagram for showing another configuration of an ozone generating system and a gas flow line according to Embodiment 5 of this invention. In the same way as that of an ozone generating system according to Embodiment 2, an ozone generating system as shown in FIG. 10 is an ozone generating system in which an intermittent operation is performed by operation control of a plurality of ozone generating apparatuses. In FIG. 10, a part which is same as or corresponding to that in FIG. 5 and FIG. 9 will be given same reference character, and description will be omitted unless it is particularly required. In the above-mentioned configuration, in the same way as that of system shown in FIG. 9, the gas exhausting device 77 is composed of the gas exhausting unit 770 and the gas refining unit 771, and the gas exhausting unit 770 is composed of the valve V5 which can control minute gas flow rate and the valve V6 which releases gas into the atmospheric air. In the above-mentioned configuration, in the same way as that of Embodiment 2, it is controlled such that among a plurality of ozone generating apparatuses, the gas exhausting device 77 is connected to an ozone generating apparatus which is in an ozone generating operation standby period, and gas which is sealed in the ozone generating apparatus is leaked to the atmospheric air via the gas exhausting device 77.

As above mentioned, in an ozone generating system according to Embodiment 5, in an ozone generating operation standby period of an intermittent operation, by using a gas exhausting device which is provided so as to exhaust gas in an ozone generating apparatus to the atmospheric air and by leaking gas in an ozone generating apparatus, gas which is sealed in the apparatus is moved in one direction from a gas entrance side to a gas exit side so as to form a moderate gas flow, therefore NO$_x$ and HNO$_3$ which is diffused in an ozone generating apparatus in an ozone generating operation standby period does not exist at a gas entrance side of an ozone generating apparatus. Consequently, diffusion of HNO$_3$ in an ozone generating apparatus can be suppressed. As a result, HNO$_3$ does enter the inside of a high voltage electrode tube whose one end is an open end, and corrosion of a high voltage tube can be prevented.

This invention is not limited to the configuration and operation of each embodiment which are described in the above, within the range of this invention, mode of each embodiment may be appropriately changed or omitted.

REFERENCE 1. gas supplying device
2. ozone generating apparatus
3. power supply
6. cooling device
7. gas circulating device
8. control unit
77. gas exhausting device

The invention claimed is:

1. An ozone generating system comprising:
   an ozone generating apparatus having discharge electrodes which are arranged facing each other so as to form a discharge space,
   a gas supplying device for supplying a material gas including oxygen to the ozone generating apparatus,
   a cooling device for supplying cooling water for cooling the discharge electrodes,
   a power supply for supplying electricity to the discharge electrodes for discharging and
   a control unit for controlling the gas supplying device and the power supply,
   wherein the control unit is adapted for performing an intermittent operation, in which an ozone generating operation period in which ozone is generated by the ozone generating apparatus by supplying the material gas from the gas supplying device to the ozone generating apparatus and by supplying the electricity from the power supply to the discharge electrodes, an ozone generating operation standby period in which the supplying of the electricity from the power supply to the discharge electrodes is stopped, a gas of the ozone generating apparatus is replaced by the material gas, a pressure in the ozone generating apparatus is increased higher than atmospheric pressure, and supplying of the material gas from the gas supplying device to the ozone generating apparatus is stopped, are alternately repeated,
   a gas circulating device for circulating gas in the ozone generating apparatus and for removing at least nitric acid from the gas which is circulated,
   wherein the control unit is adapted for the controlling such that in the ozone generating operation standby period the gas circulating device is connected to the ozone generating apparatus.

2. The ozone generating system according to claim 1, wherein a plurality of the ozone generating apparatuses are provided, the control unit is adapted for the controlling such that the intermittent operation of at least one of the ozone generating apparatus of the plurality of ozone generating apparatuses is performed, and in the ozone generating apparatus which is controlled to perform the intermittent operation, the gas circulating device is connected to the ozone generating apparatus in the ozone generating operation standby period.

3. The ozone generating system according claim 1, wherein the material gas is dry air.

4. The ozone generating system according to claim 1, wherein the material gas is oxygen gas which is generated by a Pressure Swing Adsorption oxygen generating device or a Vacuum Pressure Swing Adsorption oxygen generating device.

5. The ozone generating system according to claim 1, wherein a distance between the discharge electrodes is from 0.1 mm to 0.6 mm.

6. The ozone generating system according to claim 1, wherein one of the discharge electrodes is configured by forming a conductive film in an inner surface of a dielectric tube and a diameter of the dielectric tube is 30 mm or less.

7. The ozone generating system according to claim 1, in which ozone is generated from the material gas to be outputted, further comprising:
   a first valve for introducing the material gas from the gas supplying device to the ozone generating apparatus,
   a second valve for outputting the ozone generated by the ozone generating apparatus,
   a third valve which is connected to a port at a gas exit side which is provided between the ozone generating apparatus and the second valve, and
   a fourth valve which is connected to a port at a gas input side which is provided between the ozone generating apparatus and the first valve;
   wherein the gas circulating device is connected between the third valve and the fourth valve,
   wherein the control unit is adapted to control the first valve, the second valve, the third valve, and the fourth valve;
   wherein the first valve and the second valve are adapted to be opened, the third valve is adapted to be closed and the second valve adapted to output the ozone in the ozone generating operation period, and
   wherein the first valve and the second valve are adapted to be closed by the control unit, the third valve and the fourth valve are adapted to be opened by the control unit, and the gas circulating device is adapted to operate, in the ozone generating operation standby period, after the gas in the ozone generating apparatus is replaced by the material gas and the pressure in the ozone generating apparatus is increased higher than the atmospheric pressure.

8. An operation method of an ozone generating system which comprises:
   an ozone generating apparatus having discharge electrodes which are arranged facing each other so as to form discharge space,
   a gas supplying device supplying a material gas including oxygen to the ozone generating apparatus,
   a cooling device supplying cooling water for cooling the discharge electrodes,
   a power supply supplying electricity to the discharge electrodes for discharging and
   a gas circulating device which is connected to the ozone generating apparatus and circulates gas in the ozone generating apparatus, and removes at least nitric acid in the gas which is circulated,
   the operation method comprises:
   in an ozone generating operation period, supplying the material gas from the gas supplying device to the zone generating apparatus, generating ozone by the ozone generating apparatus by supplying the electricity from the power supply to the discharge electrodes, and an operation of the gas circulating device, and
   in an ozone generating operation standby period, supplying the electricity from the power supply to the discharge electrodes is stopped, replacing gas in the ozone generating apparatus by the material gas, increasing a pressure in the ozone generating apparatus higher than atmospheric pressure, stop supplying the material gas from the as supplying device to the ozone generating apparatus, and the gas circulating device is operated.

9. The operation method according to claim 8, wherein the ozone generating system comprises a plurality of the ozone generating apparatuses, and wherein at least one of the ozone generating apparatuses has the ozone generating operation standby period.

\* \* \* \* \*